Nov. 22, 1938.  C. F. DESPATURES  2,137,446
VEHICLE HEAD LAMP
Filed June 19, 1936  4 Sheets-Sheet 2
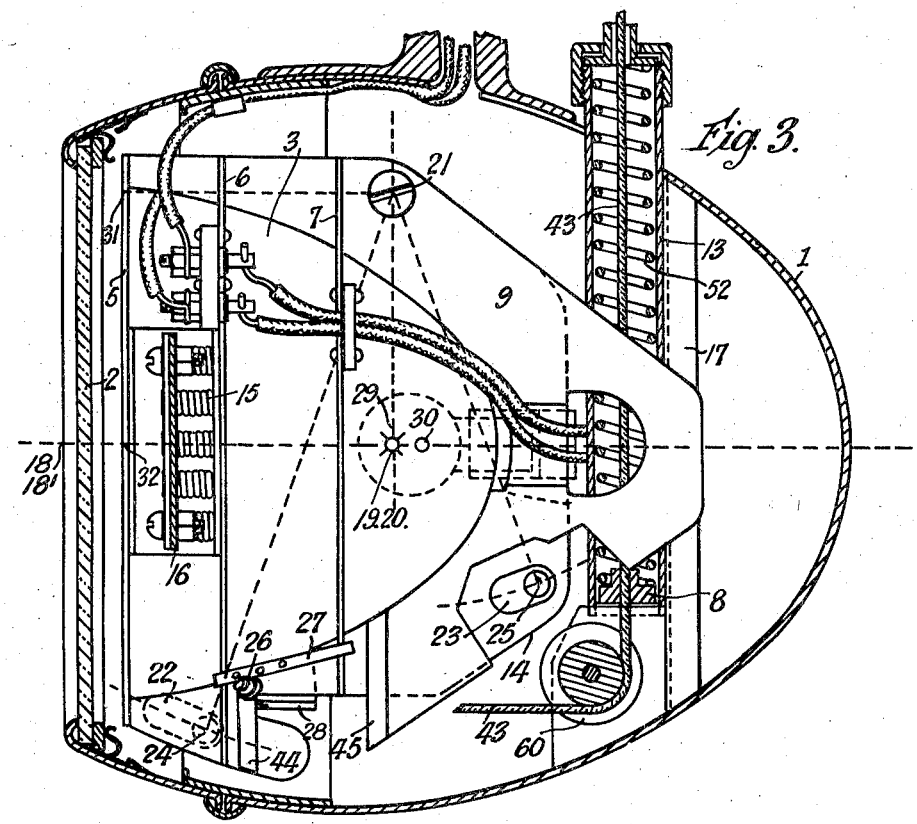
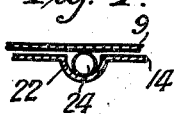
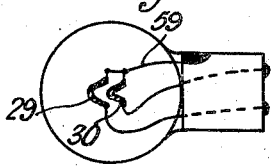
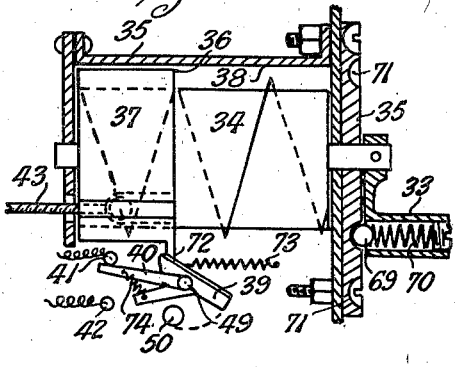

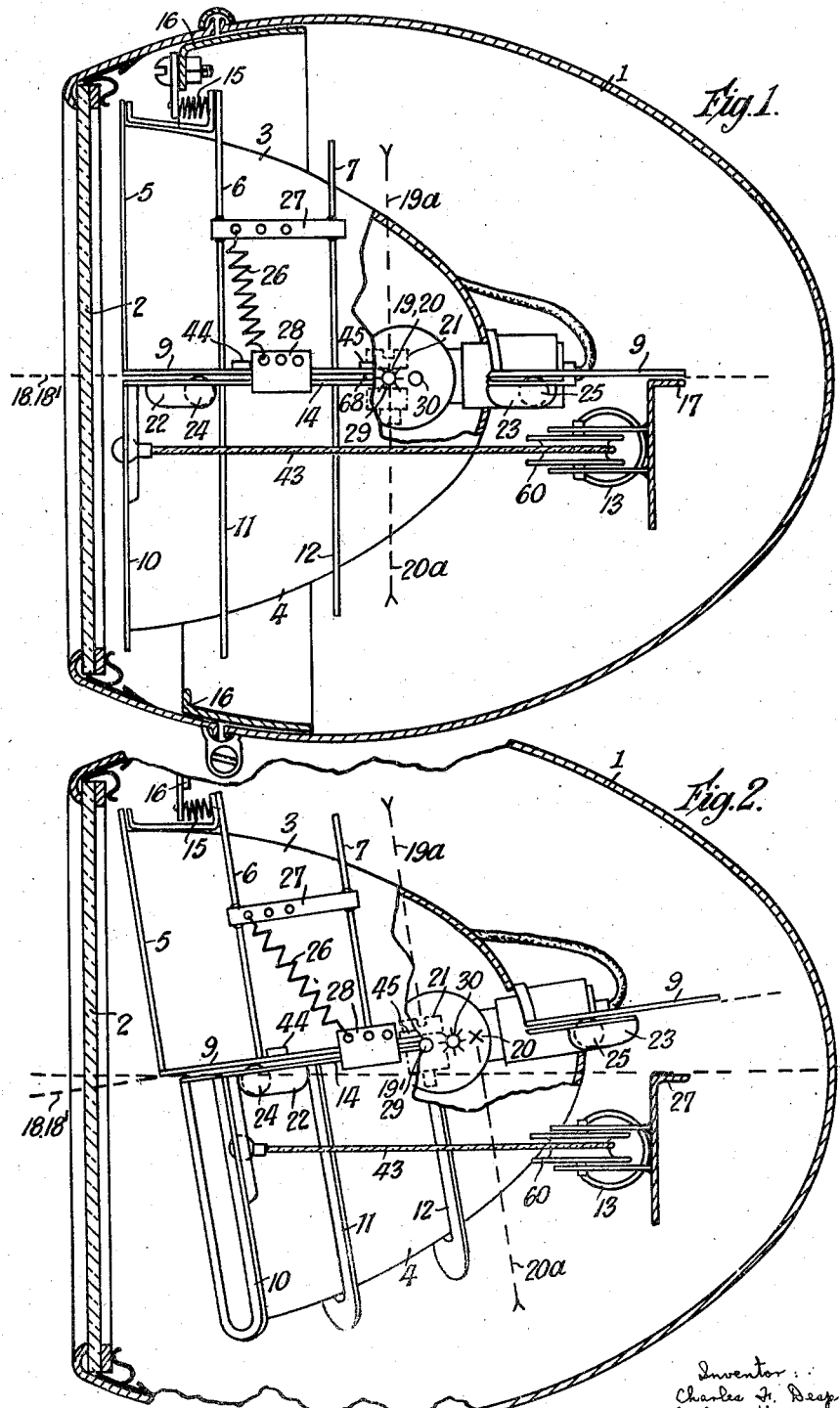

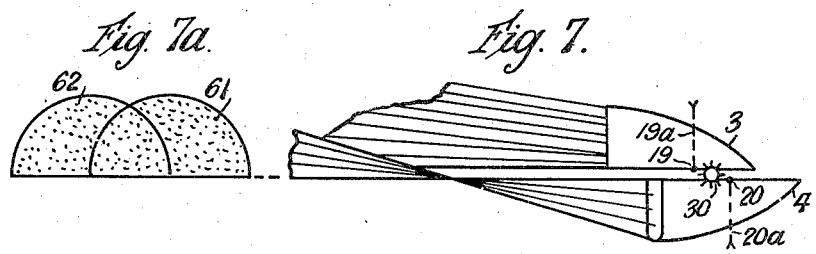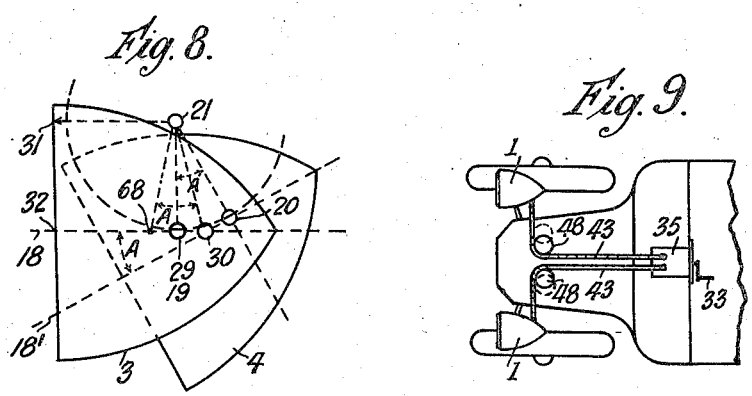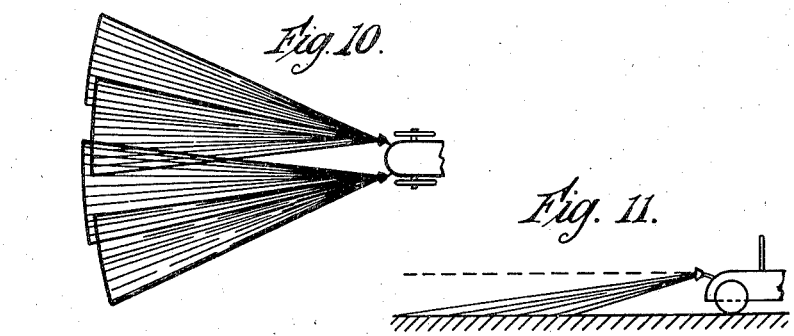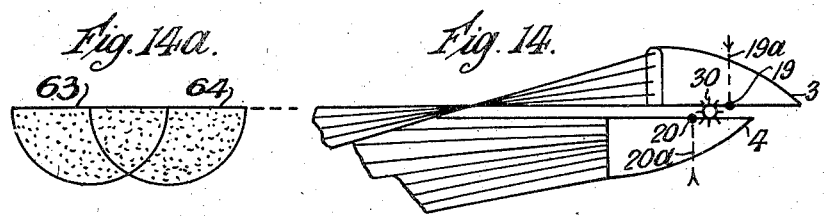

Nov. 22, 1938.  C. F. DESPATURES  2,137,446
VEHICLE HEAD LAMP
Filed June 19, 1936  4 Sheets—Sheet 4
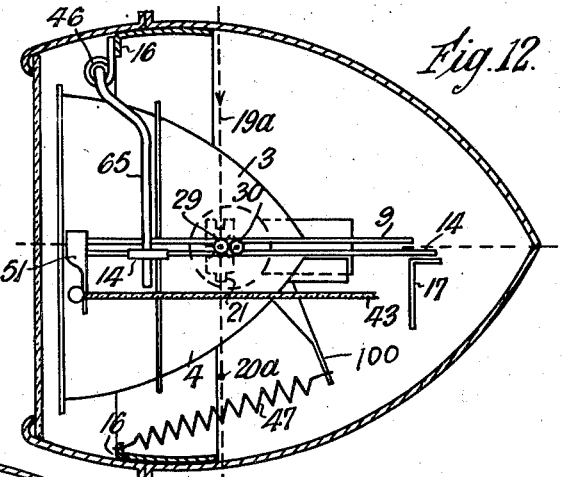
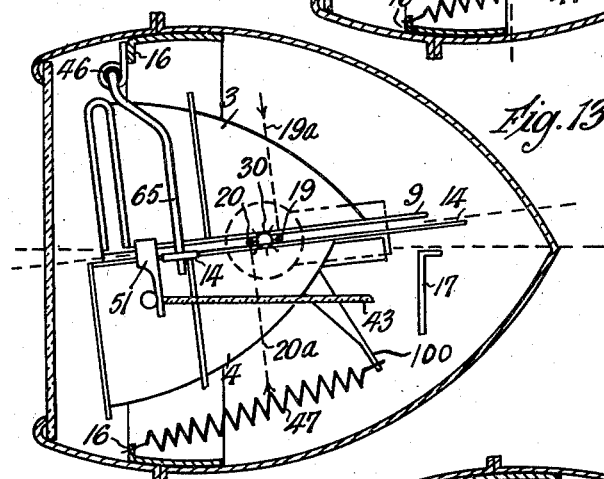
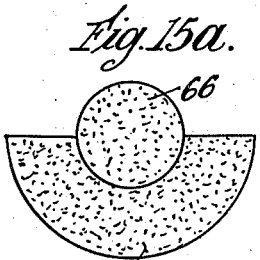
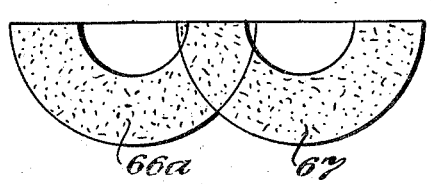
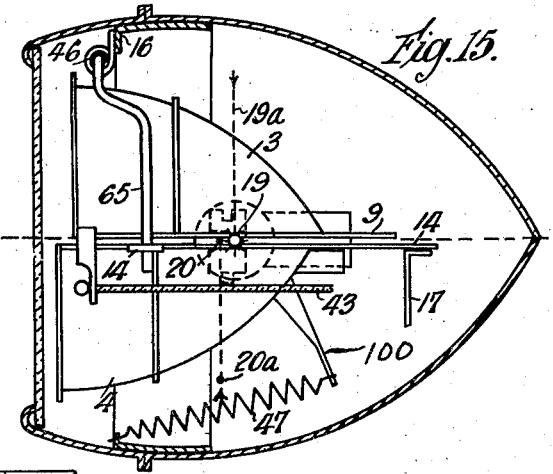
Inventor:
Charles F. Despatures;
By his attorneys,
Baldwin & Wight Patented Nov. 22, 1938

2,137,446

UNITED STATES PATENT OFFICE 2,137,446

VEHICLE HEAD LAMP

Charles Fernand Despatures, Tournai, Belgium

Application June 19, 1936, Serial No. 86,158
In Belgium July 12, 1935

4 Claims. (Cl. 240—41.6)

The invention relates to vehicle headlamps and is directed to arrangements by which the powerful lights in current use may be retained for normal running, while effective illumination is provided for passing other vehicles without dazzling an on-coming driver.

The principal object is to utilize all the light proceeding from the filament when passing another vehicle but to redistribute it over a useful width of road, while allowing no light to pass up to the line of vision of an approaching driver.

According to the invention the usual paraboloid reflector is divided at about a horizontal axial plane into two parts and means under the control of the driver operate to displace the two reflector parts in relation to each other so as to bring the focus of one in front of the source of light and that of the other behind the source of light. The whole reflector is also dipped by the same operating means, and if desired one half of the reflector may be swivelled on a vertical axis to place the two beams of light beside each other.

The two headlamps usually provided may be controlled by a single operative member to spread the light fanwise over a larger width than could be covered by one lamp alone.

Further features of the invention are disclosed in the accompanying drawings and the subsequent description relating thereto. They show by way of example three embodiments of the invention.

In the drawings

Figure 1 is a sectional elevation of a headlamp according to the invention in position for running lights, Figure 2 is a corresponding view in position for pass lights, Figure 3 is a sectional plan partly broken away corresponding to Figure 1, Figure 4 is a section of a detail, Figure 5 is a sectional elevation of the operating gear for changing from running to pass lights and vice versa, Figure 6 is a view of the lamp bulb, Figures 7, 7a and 8 are diagrams to illustrate the operation of the headlamp, Figure 9 shows in plan the combined operation of two headlamps, Figures 10 and 11 are diagrams to illustrate the combined operation, Figure 12 is a sectional elevation of a modified form of headlamp in position for running lights, Figure 13 is a corresponding view in position for pass lights, Figures 14 and 14a are diagrams to illustrate the operation of the headlamp shown in Figures 12 and 13.

Figure 15 is a view corresponding to Figure 12 of a further modification, and

Figures 15a and 15b are diagrammatic views illustrating the operation of the headlamp shown in Figure 15.

Referring first to Figures 1, 2 and 3 the headlamp has an exterior casing 1 with front window 2. The reflector of the usual paraboloid form is divided into two equal parts 3 and 4 by a horizontal plane of division passing through the axis. The upper half reflector 3 has reinforcing ribs 5, 6, 7 and a horizontal flange 9, which besides stiffening it serves for connecting the supporting and control attachments to be subsequently described. The lower half reflector 4 is likewise provided with reinforcing ribs 10, 11, 12 and a horizontal flange 14. Closed helical springs 15 arranged in a horizontal row act as a hinge to attach the upper half reflector 3 to a flange 16 inside the casing 1. The springs 15 have a bias which urges the rear part of the flange 9 against a cross piece 17 fixed in the casing 1.

The two half reflectors are connected together by a bolt 21 passing through the flange 9 and screwed into the flange 14. This bolt constitutes a pivot on which the lower half reflector 4 can swivel in relation to the upper one 3. Ball races 22, 23 in the form of short arcs of circles struck about the centre 21 are formed in the flange 14 to accommodate one ball each 24 and 25 respectively. Figure 4 shows a fragmentary section through one of the ball races. The diameter of the ball and the depth of the race should be such that the flange 9 just clears the flange 14. The clearance shown in the drawing is exaggerated for the sake of clarity.

The two half reflectors are held together on the side opposite the bolt 21 by a helical spring 26 tensioned between a bridge piece 27 spanning the ribs 6 and 7 and a bracket 28 attached to the flange 14. Both the members 27 and 28 are provided with a row of holes so that the spring can be attached at the points which are found most suitable. In any case the hole used in the bridge piece 27 should lie forward of that used in the bracket 28, so that the spring 26 not only keeps the flange 9 down on the balls 24 and 25 but tends to hold the lower half reflector in the forward position shown in Figure 1.

The movement of the half reflector is effected by the driver by means of the device shown in Figure 5. A crank handle 33 is attached to a drum 34 rotatable in a casing 35 attached to the dashboard of the vehicle. The drum 34 has a screw thread on its outer surface to engage a nut 37, the latter being prevented from rotating by a flat 36 engaging a corresponding flat 38 on the inside of the casing 35. Rotation of the drum 34 by the handle 33 thus moves the nut 37 in an axial direction. The handle 33 is hollow and contains a spring 70 pressing on a ball 69 which engages a series of depressions 71 in the end plate of the casing 35. The effect is to provide a series of definite positions of the handle and consequently of the nut 37.

A cord 43 is attached to the nut 37. The other end of the cord passes through a cylinder 13 (Figure 3) and round a pulley 60 and is attached to the lower half reflector 4 at its front edge. A plunger 6 is attached to the cord 43 and when the cord is pulled by the action of the nut 37 the plunger compresses a helical spring 52 in the cylinder 13. Although the hinge 15 and the spring 26 tend to return the half reflectors to the position of Figure 1 when they have been moved to that of Figure 2, the spring 52 is provided to keep the cord under tension and ensure its return to the normal position of Figure 1 in spite of any friction to which it may be subjected.

A stop 44 attached to the upper half reflector engages the bracket 28 in the normal position of Figure 1 to prevent the spring 26 from moving the reflectors beyond that position. Another stop 45 on the upper half reflector engages the rear edge of the bracket 28 to determine the relative positions of the half reflectors as shown in Figure 2.

The lamp bulb to be used is shown in Figure 6. It is provided with two filaments 29 for running lights and 30 for pass lights. One end of each filament is connected by a common lead 59 to the cap. The other ends of the filaments are connected to separate contacts on the cap. Corresponding contacts on the socket are connected to contacts 41 and 42 respectively shown in Figure 5. The remainder of the circuit from the socket through the battery and switch to the contact arm 40 of Figure 5 does not differ from ordinary automobile practice and is therefore not shown. The two filaments of the lamp should be as nearly as possible geometrical points and the socket, cap and filaments should be so arranged that the filaments are in line on the axis of the reflector in the position of Figure 1 with the filament 29 at the focus of the paraboloid and the filament 30 at a distance behind it which will be dealt with later.

The nut 37 of Figure 5 has a downward projection 72 which normally contacts with a three-armed lever 39 pivoted at 49 and holds it in the position shown against the tension of the spring 73. The contact arm 40 also pivoted at 49 is held against contact 41 by a compression spring 74 engaging one arm of the lever 39. When the nut 37 is moved to the right the spring 73 pivots the lever 39 and brings its lower left hand arm past the contact arm 40. The spring 74 then passes over its dead centre and snaps the arm 40 over on to contact 42. A stop 50 prevents the lever 39 from swivelling too far when the nut 37 is moved to its full extent to the right. As the nut 37 is allowed to return to its left hand position by the rotation of the crank handle 33 in a clockwise direction the spring 74 snaps the arm 40 back on to contact 41.

The method of operation will now be explained and for this purpose the diagrams of Figures 7, 7a, 8 and 9 will be considered in conjunction with Figures 1, 2 and 3. The focus of the upper half reflector will be designated 19 and that of the lower one 20. To make these foci more evident in the drawings a dotted line is drawn perpendicular to the axis of each half paraboloid meeting the axis at the focus. These lines are designated 19a and 20a respectively. The axis is designated 18.

Figure 1 shows the lamp in position to give running lights. The two half reflectors constitute parts of one paraboloid with horizontal axis 18. The foci 19 and 20 coincide and the bulb (Figure 6) is placed with its filament 29 at the focus. The nut 37 (Figure 5) is forward and the contact arm 40 is on contact 41 so that current passes through filament 29, while filament 30 is cut out. The star rays round the small circle 29 in Figures 1 and 3 are intended to denote that the filament 29 is alight. The arrangement is then equivalent to the usual fixed headlamp, and a powerful, highly concentrated beam of light is directed forwards.

If now some other road user is approaching and it is desired to avoid dazzling him, the driver turns the handle 33 to the desired extent moving the nut 37 to the right. The contact arm 40 then passes over to contact 42 so that filament 30 lights up instead of filament 29, as indicated in Figures 2 and 7. The pull on the cord 43 dips the two half reflectors 3 and 4 together by flexure of the hinge springs 15, the lampholder remaining attached to the upper half reflector 3. The lower half reflector 4 also pivots about the bolt 21 so that its focus 20 comes about as far behind the filament 30 as the focus 19 of the upper half reflector is in front of it, as shown in Figures 7 and 8. The axis of the upper half reflector remains at 18 as viewed in plan but that of the lower half reflector is turned to the position 18' of Figure 8.

Figure 7a shows the appearance of the patch of light which would then be provided if the beam were projected on to a near wall, but on the assumption that the lamp is not dipped. The upper half reflector 3 has the filament 30 behind its focus 19 and sends a divergent beam which forms a semicircle, base down, 61. The lower half reflector has the filament in front of its focus and so converges the light to a point a short distance away, after which the light diverges to form another semicircle, base down, 62 about the same size as 61. The semicircle 62 is to the left of the semicircle 61 because the lower half reflector has pivoted about the bolt 21.

If a lamp with the filament at the focus is merely dipped, the beam is so narrow that only a very small road area is illuminated, the rest being in darkness accentuated by the brilliance of the illuminated part. If a lamp with divided reflector has one half swivelled without dipping no relief from dazzle is obtained and if dipping is resorted to the result is little better than with an undivided reflector. Throwing the beam out of focus will reduce the dazzle but of itself it will not give much illumination on the road. Only the combination according to the invention of the three features mentioned will give an entirely satisfactory pass light. Throwing the beam out of focus gives a wide enough spread for the dipped lamp to illuminate an adequate road area, and this area is further widened by placing the two part beams like 61 and 62 side by side.

The determination of the correct position for the bolt 21 will now be described. In Figure 3 a dotted construction line has been drawn through the centre of the bolt 21 in the plane of division of the reflector parallel to the axis 18 to meet the front edge of the reflector in the running position at 31. The axis 18 meets the plane of the front edge of the reflector at a point which will be designated 32. The bolt 21 must be so placed that its distance from the point 31 is equal to the distance from the point 32 to the filament 19 for the running light.

Figure 8 shows a geometrical construction by which the various dimensions may be correctly inter-related. It represents the two half reflectors in plan on the plane of division. To fix ideas let the filaments 29 and 30 be 4 mm. apart and A will be used to designate the angle through which the lower half reflector swings about the pivot 21. It has been stated above that the filaments 29 and 30 must be on the axis 18. Take a point 68 about 4 mm. in front of the focus 19 of the upper half reflector. Then the angle A is 68, 21, 30 and the line 21, 19 bisects the angle. The point 68 on the lower reflector half, before it pivots, moves to 30, and the focus moves from coincidence with the focus 19 to the position 20 shown in the drawings. The filament 30 is thus 4 mm. behind the focus 19 of the upper half reflector 3 on the axis 18 and 4 mm. in front of the focus 20 of the lower half reflector 4 on the shifted axis 18'. The dotted circular arc denotes the swivelling of the half reflector.

To sum up, two operating conditions are provided. In the one for running lights the effect is exactly the same as with the usual powerful headlights. In the other for pass lights three modifications have been made by turning one handle: firstly, the lower half reflector has been drawn back and swivelled to place its beam beside that of the upper half reflector; secondly, the source of light has been thrown out of focus, being located about midway between the foci of the two half reflectors; and thirdly, the half reflectors and lamp bulb together have been dipped. This combination, as pointed out above, provides the ideal pass lights.

These alternative conditions refer to the extreme positions of the handle 33 (Figure 5). There are however intermediate positions which provide intermediate effects. The first result of a movement of the handle 33 is to change over the filaments, so that the lamp is put out of focus. Then the lower half reflector is swung round to provide a wide fan-like beam. The dipping movement comes last and can be regulated to suit the conditions of traffic at the time. The order of operation is determined by the location and dimensions of the lever 39 (Figure 5) and by the relative strength of the springs 15 and 26 (Figure 1).

The description up to this point related to a single lamp, but most automobiles are provided with two. Figure 9 shows how the invention is applied to the two lamps. The cord 43 is duplicated, but both cords are actuated by one device of the kind shown in Figure 5. The cords pass over pulleys 48 to the respective lamps 1, 1, but the lower half reflector of the left hand lamp swivels to the left while that of the other swivels to the right. The flat fan-shaped beam is thus much wider as shown diagrammatically in Figure 10. Figure 11 shows how the beam of light appears from the side. This method of combined operation of two lamps is also applicable to the modified lamps about to be described.

It is not necessary for the lower half reflector to swivel. An arrangement will now be described with reference to Figures 12 to 14 in which the upper half reflector swivels. This may be of advantage in certain cases.

The lower half reflector 4 has its flange 14 attached to a bail 65 and the latter is fastened to a flange 16 at the top of the casing 1 by a hinge 46. This hinge could if desired take the form of springs 15 as shown in Figures 1 to 3. A tension spring 47 attached to the lower part of the flange 16 and to an arm 100 integral with the lower half reflector 4 tends to keep the reflector in the position of Figure 12 in which the rear end of the flange 14 rests on the cross piece 17.

The upper half reflector has a downward projection 51 from one side of the flange 9, and the cord 43 is attached to this projection. The remainder of the mechanism is as previously described in connection with Figures 1 to 3.

If this lamp is set for pass lights the course of the rays will be as shown in Figure 14. In contrast to Figure 7 the lower half reflector gives a divergent beam and the upper a beam which first comes to a focus and then diverges. Projection on a wall gives semicircular patches of light base up, viz 63 from the upper and 64 from the lower half reflector as shown in Figure 14a.

When a single filament bulb is used the lamp of Figures 12 and 13 may be modified as shown in Figure 15. The filament is placed at the focus 19 of the upper half reflector and in the position of Figure 15 for running lights gives a concentrated spot 66 on a wall. The focus 20 of the lower half reflector 4 is placed a little forward from the focus 19 and the lampholder is attached to this half. Consequently a diffused semicircle 67 of light, base up is produced as shown in Figure 15a.

The running light is rather more than half as powerful as in the previous case, but, when the cord 43 is pulled and the upper half reflector 3 has pivoted about the bolt 21, the light distribution is as shown in Figure 15b. The semicircle 67 remains, but the bright circular patch 66 has become a semicircle 66a similar to 67 but laterally displaced, just as in the case shown by Figure 14a described above. By the dipping of the whole reflector the patches of road illuminated are brought to a few yards from the vehicle. Between the two extreme positions described there are intermediate ones of which one is the best for passing lights, while the others are available for special conditions such as fog.

With the slightly yielding hinge spring 15 the lateral pull of the cord 43 tends to swivel the whole lamp slightly about a vertical axis, and this helps to separate the beams when two lamps are arranged as shown in Figure 9. Such a separation of the beams could be obviated by a fixed slide on the cross-piece 17.

The invention is of importance in providing for effective illumination under all road conditions. The running lights remain powerful as with ordinary fixed lamps, while under other conditions the illumination is greatly improved by the features enumerated, as compared with any system hitherto proposed.

For passing the rays are maintained at such strength with the specified movements of the reflector that the area of road in which passing takes place can be uniformly and sufficiently illuminated over a large width, just as for running the road is illuminated over a great length and small width.

The comparative proximity of the road area illuminated by the pass light and the far distance of that illuminated by the running light equalizes the intensity of illumination as seen by the driver. If two unequal illuminations follow each other rapidly the driver is unable to see well during the period of accommodation of his eyes. Hence the equality of brightness provided by the invention makes for much greater safety in night driving.

The dipping also counteracts the effect of pitching movements on bad roads which would vary the range of the headlamps.

In difficult country, such as among mountains, safety is ensured by the possibility of regulating the distance at which the road is illuminated and also of lighting up the road margins and precipices. In fog all the light can be concentrated near the vehicle to provide maximum illumination.

Other arrangements than the cord 43 could be used to carry out the desired movements of the various parts, such as cams, electromagnets, electric motors or Bowden wires.

What I claim is:

1. A vehicle headlamp comprising a reflector of substantially paraboloid form divided at about a horizontal axial plane into upper and lower halves, lighting means having a first filament and a second filament, said first filament being located approximately at the focus of the paraboloid, means operative to displace the lower reflector half to bring its focus beyond the second filament in relation to the focus of the upper reflector half, the said means also being operative to dip the two reflector halves together, and a change-over switch operatively connected to said displacing means to disconnect the first filament from its source of supply and connect the second thereto.

2. A vehicle headlamp comprising a casing, a reflector of substantially paraboloid form divided at about a horizontal plane into two parts, a hinge spring attaching the upper part of the reflector to the top of the casing, a vertical pivot at one side of the reflector connecting the two parts together, a tension spring on the other side of the reflector having one end attached to each of the two parts and set obliquely to urge the lower part forward in relation to the upper part as well as holding the two parts together, tension means attached to the lower reflector part on the side away from the vertical pivot to draw the said reflector part rearwards about the said pivot and the whole reflector about the hinge spring, a locating stop attached to the casing, and an abutment on one reflector part located to contact with the stop when the tension means is released.

3. A vehicle headlamp comprising a casing, a reflector of substantially paraboloid form divided at about a horizontal axial plane into two parts, a pivot connection between the two reflector parts, a hinge connection between the casing and the reflector near the top of the latter, a source of light located approximately at the focus of the paraboloid, a second casing, a threaded drum rotatable in the second casing, a handle attached to the drum for rotating it, spring urged locating means for the handle, a nut engaging the drum, means for preventing the nut from turning, and a cord attached by one end to the drum and by its other end to one reflector part to displace it in relation to the other and at the same time to dip both reflector parts together.

4. A vehicle headlamp comprising a casing, a reflector of substantially paraboloid form divided at about a horizontal plane into two parts, a bail hinged to the top of the casing and attached to the lower reflector part, a pivot at one side of the reflector connecting the two parts together, an arm projecting downwards on the other side from the upper reflector part, tension means attached to the arm to draw the upper reflector part rearwards, an arm projecting downwards from the lower reflector part, a tension spring connected between the said arm and the casing to urge the arm forward, locating stops to limit the relative movements of the reflector parts, and a source of light.

CHARLES FERNAND DESPATURES.